Patented Jan. 17, 1950

2,494,545

UNITED STATES PATENT OFFICE 2,494,545

LIGNIN RESINS AND PROCESS OF MAKING SAME

Raymond Norris Evans and Angelo Paul Ingrassia, Laurel, Miss., assignors to Masonite Corporation, Laurel, Miss., a corporation of Delaware No Drawing. Application April 20, 1946, Serial No. 663,750

6 Claims. (Cl. 260—17.5)

This invention relates to resins having high resistance to alkali and acid and made from components comprising lignin in substantial proportions, and the methods of making and using such resins.

By the present invention, lignin which is readily soluble in alkali, forming dark-colored solutions, is reacted with polymerized furfuryl alcohol, and resin is obtained which is resistant to alkali and to acid, and also resistant to absorption of water. In order to secure intimate admixture of these two materials and so facilitate their reaction, they are put into solution in organic solvents adapted to dissolve both the lignin and the polymerized furfuryl alcohol. Such solvents are hereinafter referred to as common solvents for these materials. Common solvents which are of substantially neutral or non-reactive character are preferred. Boiling points thereof should preferably be above about 100° C. to permit substantial heating at atmospheric pressure during reaction. Examples of such common solvents are tetrahydrofurfuryl alcohol, monoalkyl ethers of ethylene glycol, such as ethylene glycol mono methyl ether and ethylene glycol mono ethyl ether, diethylene glycol and ethers of diethylene glycol, but other organic oxygen-containing common solvents may be used.

The reaction between the lignin and the polymerized furfuryl alcohol can be carried out with use of soluble lignin which has been isolated, or it can be carried out with such lignin in situ in acid-hydrolyzed ligno-cellulose fiber, and in the latter case hardboards, molded products and the like, containing such fiber as well as the resinous products of the reaction, can be produced which are resistant to alkali and acid and to absorption of water.

The principal objects of the invention are the provision of resins made from lignin and polymerized furfuryl alcohol, and of products containing such resins and acid-hydrolyzed ligno-cellulose fiber, which resins and products are of high alkali and acid resistance and are resistant to absorption of water, and the provision of methods for the production of such resins and resin-containing products.

The soluble lignin is preferably provided by subjecting wood or other ligno-cellulose material to hydrolysis in the presence of mild acids. The acid-hydrolyzed ligno-cellulose material is preferably prepared by subjecting wood chips to the action of high-pressure steam in a closed chamber, as for example a gun such as described in U. S. patent to Mason, No. 1,824,221. In such treatment, organic acids such as acetic and formic acids are formed, and acid hydrolysis of the ligno-cellulose material is effected, with lignin being set free. After treatment with steam, the contents of the gun are disintegrated, preferably by being explosively discharged from the region of high steam pressure to a region of substantially atmospheric pressure. Material so produced has a pH of about 3 to 4.

The time required for the steam treatment decreases rapidly with increase of the steam pressure used. For example, 25 minutes treatment with steam at 275 p. s. i. (temperature of 212° C.), has approximately the same effect as treatment for 5 seconds with steam at 1000 p. s. i. (temperature of 285° C.). Fiber made by such treatment of wood chips is well adapted for production of fiber for making hardboards and like products.

In general, the longer the steam treatment is continued at a given temperature, the higher is the proportion of the freed soluble lignin, and such longer steam treatment is preferable in case the lignin is to be extracted. For example, wood chips subjected to steam raised to 600 p. s. i. in 30 seconds, then raised to 1000 p. s. i. and held for 5 seconds, followed by preferably explosive disintegration, contains a good proportion of extractible lignin, as for example 10 to 12% on dry weight of chips. Higher yields of such lignin can be extracted from ligno-cellulose material given a steam treatment of 15 or more seconds with steam at 1000 p. s. i., for example. For illustration, a typical figure for yield of soluble lignin from wood chips treated with steam at 1000 p. s. i. for 15 seconds and reduced to fiber is about 17-18% based on dry weight of chips. The steam-treated and disintegrated material is preferably washed with water to largely remove the water-soluble organic acids, such as formic and acetic, and water-soluble hemi-cellulosic material.

For extraction of the lignin from acid-hydrolyzed ligno-cellulose, dilute alkali solution, such as 1-3% sodium hydroxide solution for example, is preferably used, and the lignin precipitated by decreasing the pH of the solution, as for example by addition of hydrochloric acid, and then separated from the liquid by filtration. The separated lignin is preferably treated with dilute hydrochloric acid to set free any cations picked up in the process, filtered and washed with distilled water. Instead of treating with dilute alkali, organic solvents, such as ethylene glycol mono methyl ether for example, can be used to dissolve the lignin, and the lignin recovered by precipitating in water or by evaporating the solvent or in other ways. Treating the entire mass of hydrolyzed ligno-cellulose with such organic solvents is expensive and it is preferred to extract the lignin therefrom with dilute alkali solution and precipitate it and then confine the treatment with the organic solvents to the lignin material so obtained. The lignin used for resin making in examples below was prepared by treatment of acid-hydrolyzed exploded wood fiber with 3% sodium hydroxide solution at a temperature of 50° C., and treated with dilute hydrochloric acid and washed as above described. Such lignin when precipitated and dried is light and fluffy, and use of a common solvent for bringing it into intimate contact with polymerized furfuryl alcohol resin is highly advantageous.

The polymerized furfuryl alcohol to be used as a component in forming the lignin and polymerized furfuryl alcohol resin can be made by heating furfuryl alcohol without added catalyst for several hours, but the polymer is preferably made from furfuryl alcohol by heating it in the presence of catalysts such as iodine, or boron trifluoride, or acids such as phthalic, formic, phosphoric, oxalic, furoic, and the like acids.

During catalytic polymerization of the furfuryl alcohol, heat is evolved and, if the reaction is not properly controlled, it may become explosive in nature. In order to control the reaction, water is preferably added to the furfuryl alcohol. About 40% of water based on weight of furfuryl alcohol can be advantageously used. Heat is applied to the mixture and it is refluxed. Initially, the added water acts as a diluent for the furfuryl alcohol, and also as the furfuryl alcohol polymerizes with attending reduction of solubility in water, the reflux water will permit control of the reaction temperature by absorbing the heat of the reaction. When so controlled and the application of heat suitably regulated, the reaction will not become too vigorous, and undesirable decomposition of the furfuryl alcohol will be avoided.

When acid catalysts are used, the rate of polymerization appears to be a function of the pH and the temperature. Preferably, the polymerization is carried on at a pH of about 2 to 3, and is sufficiently advanced in about 2 to 4 hours. If the polymerization is carried on at a higher pH, say about 4 to 5, longer periods of time may be required. The polymerization treatment is confined to the production of partially polymerized furfuryl alcohol in order to obtain a component adapted for reaction with lignin. Such polymerized material, ranging from the relatively fluid stage to a polymer having a Ford cup viscosity of about 1 minute at 100° C., is well adapted for this purpose. (For description of Ford cup test, see "Lacquer and Synthetic Enamel Finishes," by Martin, published 1940, at page 279.)

The following example is illustrative of modes which can be followed for preparing partially polymerized furfuryl alcohol well adapted for use in making lignin-polymerized furfuryl alcohol resin.

*Example A.*—235 pounds furfuryl alcohol, 170 pounds water and 2.5 pounds phthalic anhydride were refluxed at 100° C. for 3 hours, at which time the Ford cup viscosity of the material was 22 minutes at 30° C. The material so produced was subjected to vacuum evaporation for 8 hours at 55° C. and then for 6 hours more at 90° C. The yield was 187 pounds of polymerized furfuryl alcohol with a Ford cup viscosity of 42 seconds at 100° C. This material had an acid number of 3.5 (milligrams of sodium hydroxide per gram sample), and contained 93% solids. It was used in the illustrative examples given below as one of the reactants in forming lignin-polymerized furfuryl alcohol resins.

With suitable catalytic material present, the reaction between the lignin and the polymerized furfuryl alcohol will take place at elevated temperature. The catalyst which was used in promoting the partial polymerization of the furfuryl alcohol, or part thereof, may be retained in the polymerized furfuryl alcohol material used for making the lignin-polymerized furfuryl alcohol resin, and in such case, it may be unnecessary to add additional catalyst to promote the reaction of such material with lignin. However, added catalyst may be used if desired, preferably of the same type as used for polymerizing the furfuryl alcohol.

Parts in the examples which follow are parts by weight.

Example 1 which follows illustrates the substantial alkali insolubility of the preferred lignin-polymerized furfuryl alcohol resins, and also shows substantially the limiting proportion of lignin which may be used in forming lignin-polymerized furfuryl alcohol resins which are resistant to alkali and to acid and have suitable hardness.

*Example 1.*—Lignin together with polymerized furfuryl alcohol prepared as described in Example A (having an acid number of 3.5, making added catalyst unnecessary), were dissolved in ethylene glycol mono methyl ether which is a common solvent for these materials. The proportion of lignin was varied as shown in the table below. The solution was heated in an oven at 130° C. to promote reaction between the lignin and polymerized furfuryl alcohol and to drive off most of the volatiles (which can be recovered if desired). The heating was continued until the resinous reaction products were sufficiently hard for grinding when cooled to room temperature. The reaction products were ground to pass through a 40-mesh screen and pressed into test specimens in a heated press under pressure of 1750 p. s. i. held for a period of 5 minutes at temperatures of 165° C. and 200° C., and chilled while under said pressure. Properties obtained on test are shown in the following table:

| Per cent Lignin in resin based on total weight of partially polymerized furfuryl alcohol and lignin | Resin specimens made at 1750 p. s. i. and press temp. of 165° C. (Volatile content 2.5% at time of molding) | | Resin specimens made at 1750 p. s. i. and press temp. of 200° C. (Volatile content 1.0% at time of molding) | | 3% $H_2SO_4$ |
|---|---|---|---|---|---|
| | Sp. Gr. | Per cent Uptake after (24 hrs.) immersion in 1% alkali | Sp. Gr. | Per cent Uptake after (24 hrs.) immersion in 1% alkali | |
| 0 | 1.29 | .14 | 1.29 | .15 | .14 |
| 5 | 1.31 | .14 | 1.30 | .09 | .10 |
| 10 | 1.29 | .14 | 1.30 | .08 | .10 |
| 20 | 1.30 | .07 | 1.31 | .12 | .10 |
| 40 | 1.31 | .17 | 1.32 | .18 | .14 |
| 50 | 1.31 | .51 | 1.31 | .48 | .40 |
| 60 | 1.31 | 2.12 | 1.32 | .71 | .33 |
| 70 | 1.29 | 8.80 | 1.31 | 3.34 | .64 |
| 80 | 1.30 | 23.4 | 1.31 | Partially [1] D | 1.07 |
| 100 | 1.33 | [1] D | 1.31 | [1] D | 1.05 |

[1] D: specimen disintegrated and alkali solution black in color.

While the precise nature of the reaction between the lignin and polymerized furfuryl alcohol cannot be stated with certainty, it appears clear that a reaction occurs between them. Example 1 shows that when much more of the lignin component is used than of the polymerized furfuryl alcohol component, the material produced does not have good resistance to alkali. This, and the known ease of solution of lignin in alkali indicate that in such case unreacted lignin is present and not all the lignin has been reacted. With lower percentages of lignin, up to about 50% or 60% of lignin, based on weight of polymerized furfuryl alcohol plus lignin, substantially alkali-insoluble resins are obtained, indicating that substantially all the lignin has been reacted. The reacted lignin-polymerized furfuryl alcohol resins containing up to about 60% lignin also show good resistance to acid solutions.

Example 2 which follows illustrates the making of lignin-polymerized furfuryl alcohol resins with the soluble lignin component thereof in situ in the acid-hydrolyzed ligno-cellulose fiber.

*Example 2.*—To 50 parts of the polymerized furfuryl alcohol dissolved in 250 parts of ethylene glycol mono methylether, were added 100 parts of ground-up acid-hydrolyzed wood fiber containing alkali-soluble lignin. These materials were thoroughly mixed in a mechanical mixer. Since over about 6% of volatiles may be detrimental, the resulting mixture was heated in a wire basket in an oven until its content of volatiles had been reduced below such percentage. In this case, the reduction was to 3.7%. A specimen was pressed at 1750 p. s. i. and temperature of 210° C. for five minutes and chilled while under said pressure, and had the following properties:

| | |
|---|---|
| Specific gravity | 1.39 |
| Modulus of rupture (p. s. i.) | 9380 |
| Hardness (Rockwell M): | |
| Room temp. | 81 |
| Hot (105° C.) | 38 |
| Water immersion: | |
| Percent uptake 24 hrs. | 1.1 |
| 1% alkali immersion: | |
| Percent uptake 24 hrs. | 4.3 |

The uptake on 24-hour immersion in 1% alkali solution of a similar specimen, without polymerized furfuryl alcohol resin addition, was 16.1%.

In a variant of the procedure of Example 2, alkali-resistant surface portions can be formed in a sheet of acid-hydrolyzed ligno-cellulose fiber in the following way. A solution of polymerized furfuryl alcohol in a common solvent for lignin and for polymerized furfuryl alcohol is sprayed on the surfaces of a porous sheet of such fiber containing soluble lignin. The volatiles in the sheet are reduced to a low percentage by stoving, and then the sheet is permanently consolidated by application of heat and pressure.

Example 3 which follows illustrates addition of lignin-polymerized furfuryl alcohol resin having a relatively low lignin content to acid-hydrolyzed ligno-cellulose fiber containing soluble lignin to further react such resin with the lignin in the fiber.

*Example 3.*—50 parts of lignin and 162 parts of the polymerized furfuryl alcohol were dissolved in 157.5 parts of tetrahydrofurfuryl alcohol. No added catalyst was used since the partially polymerized furfuryl alcohol contained catalyst. The solution was refluxed for 7 hours at 115° C. After the reflux treatment, the mixture was evaporated under vacuum for 2 hours at 115° C. in order to partially remove the volatile, non-resinous material. The resulting black viscous resin solution was now 267 parts.

60 parts of this resin solution were mixed with 265 parts of ethylene glycol mono methylether together with 100 parts of acid-hydrolyzed lignocellulose fiber, which had been ground to pass a 40-mesh screen. After thorough mixing in a mechanical mixer to form a mass of substantially doughlike consistency, the resin-fiber mixture was placed in a wire basket and heated for approximately 20 minutes in an oven held at 130° C. The resin-fiber material so obtained contained about 1.9% of volatiles. This material was ground to pass a 40-mesh screen. A specimen was made from this material by pressing in a heated press at a pressure of 1750 p. s. i. and temperature of 210° C. for a period of 5 minutes and chilling while under said pressure and had the following properties:

| | |
|---|---|
| Specific gravity | 1.40 |
| M. O. R. (p. s. i.) | 8620 |
| Hardness Rockwell "M" room temp. | 98 |
| Water immersion: | |
| Percent uptake 24 hrs. | 0.3 |
| 1% alkali immersion: | |
| Percent uptake 24 hrs. | 2.2 |

The resin of the present invention can be put to a variety of uses in addition to those which have been described. Its property of withstanding high temperatures such as 210° C. during the molding operation specially adapts it for use in making hot-pressed ligno-cellulose fiber products from dry or practically dry fiber, and because of the alkali resistant properties secured by its use in ligno-cellulose fiber products, these products are well adapted for concrete form liners, drain boards and the like, in which alkali resistance is important. It is to be understood that the examples are for illustration only and not for limitation, and the breadth of the invention is as defined in the claims.

We claim:

1. Process of preparing a water, acid, and alkali resistant, hard resinous material which comprises dissolving alkali soluble lignin and partially polymerized furfuryl alcohol in a common solvent chosen from the group consisting of monoalkyl ethers of ethylene glycol, diethylene glycol, ethers of diethylene glycol and tetrahydrofurfuryl alcohol to form a solution, said components being the only reactive materials present, heating the materials to react the lignin and partially polymerized furfuryl alcohol, and removing the solvent whereby a hard resinous material is formed, the weight of said lignin being between 5 and 60% of the total weight of the lignin and the partially polymerized furfuryl alcohol.

2. Process as defined in claim 1, and wherein the reaction is carried in the presence of a catalyst.

3. Process as defined in claim 1, and wherein the reaction is carried on in the presence of an acid catalyst.

4. Process of preparing a consolidated water, acid and alkali resistant fibrous product which comprises adding partially polymerized furfuryl alcohol dissolved in a solvent chosen from the group consisting of monoalkyl ethers of ethylene glycol, diethylene glycol, ethers of diethylene glycol and tetrahydrofurfuryl alcohol, said solvent also being a solvent for lignin, to acid hydrolyzed lignocellulose fiber material containing free lignin, said components being the only reactive materials present, heating the materials to react the partially polymerized furfuryl alcohol with the lignin of the fiber material until the volatile content is less than about 6% of the weight of the resulting intermediate product, and then consolidating said product under heat and pressure, the weight of said lignin being between 5% and 60% of the total weight of the lignin and the partially polymerized furfuryl alcohol.

5. Process as defined in claim 4, and wherein the reaction is carried on in the presence of a catalyst.

6. Process as defined in claim 4, and wherein the reaction is carried on in the presence of an acid catalyst.

RAYMOND NORRIS EVANS.
ANGELO PAUL INGRASSIA.

REFERENCES CITED

The following references are of record in the file of this patent:

UNITED STATES PATENTS

| Number | Name | Date |
|---|---|---|
| 2,247,210 | Schorger | June 24, 1941 |
| 2,325,570 | Katzen | July 27, 1943 |
| 2,343,973 | Harvey | Mar. 14, 1944 |
| 2,345,966 | Fiedler | Apr. 4, 1944 |
| 2,367,312 | Reineck | Jan. 16, 1945 |
| 2,404,840 | Harvey | July 30, 1946 |
| 2,421,623 | Kistler | June 3, 1947 |
| 2,432,890 | Hersh | Dec. 16, 1947 |
| 2,437,955 | Hersh | Mar. 16, 1948 |